E. D. DUNNING.
ROLLER BEARING.
APPLICATION FILED AUG. 30, 1915.

1,169,469. Patented Jan. 25, 1916.

Witness
E. R. Barrett

Inventor
Elmer D. Dunning.
by Pagelsen and Spencer
Attys.

UNITED STATES PATENT OFFICE.

ELMER DWIGHT DUNNING, OF DETROIT, MICHIGAN.

ROLLER-BEARING.

1,169,469.　　　　Specification of Letters Patent.　　Patented Jan. 25, 1916.

Application filed August 30, 1915. Serial No. 47,920.

*To all whom it may concern:*

Be it known that I, ELMER D. DUNNING, a citizen of the United States, residing at Detroit, in the county of Wayne and State of Michigan, have invented a new and useful Roller-Bearing, of which the following is a specification.

This invention relates to bearings for shafts, axles and other revolving members, and its object is to provide a bearing which will resist relative endwise movement of the revolving member in one direction, which will operate with minimum friction, which may be assembled and disassembled without the use of tools, and which can be constructed at low cost.

This invention consists, in combination with interior and exterior bearing rings having circumferential shoulders or flanges on their opposing faces to constitute thrust rings, of a series of rollers fitting between said faces and engaging said shoulders, and a pair of sheet metal rings having resilient interlocking spacing bars to position the rollers.

Figure 1:
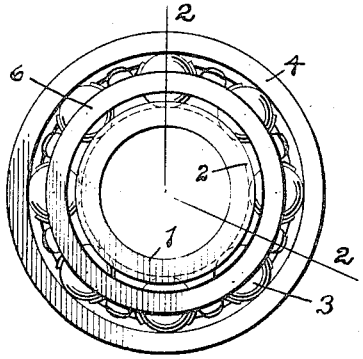
Figure 2:
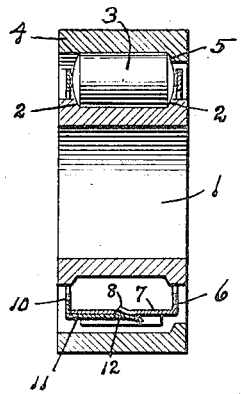
Figure 9:
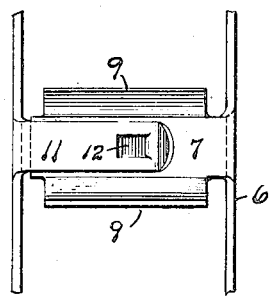
Figure 5:
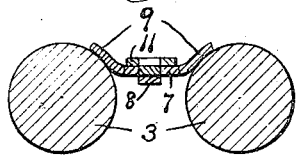
Figure 6:
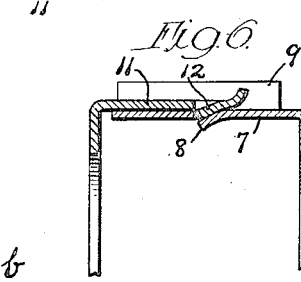
Figure 7:
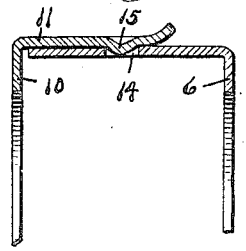
Figure 8:
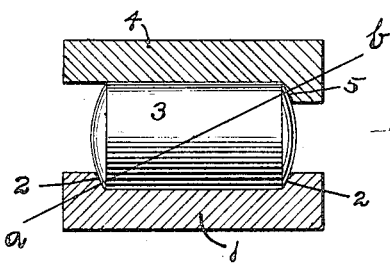
Figure 3:
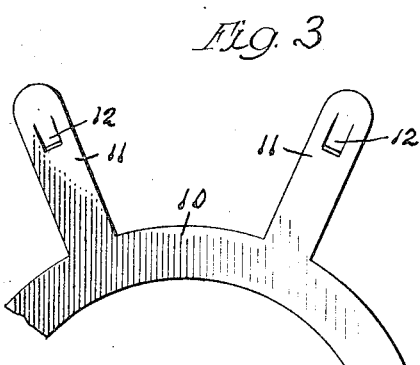
Figure 4:
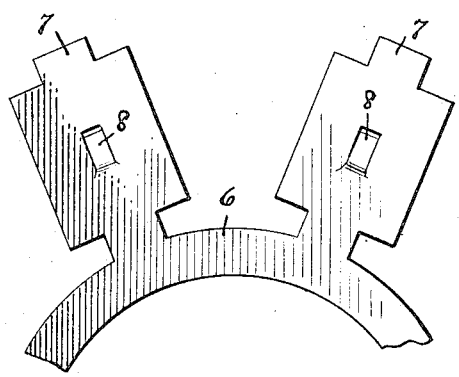
Figure 10:
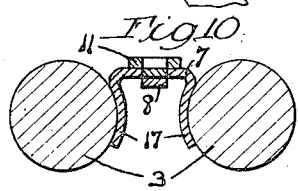

In the accompanying drawings, Figure 1 is an end elevation of this improved bearing. Fig. 2 is a section on the line 2—2 of Fig. 1. Fig. 3 is a plan of a portion of one of the cage blanks. Fig. 4 is a plan of a portion of the other cage blank. Fig. 5 is a central transverse section of a pair of rolls and the retainer between them. Fig. 6 is a longitudinal section of a cross bar of the cage. Fig. 7 is a similar section of a modified form of this cross-bar. Fig. 8 is a longitudinal section through the bearing rings. Fig. 9 is a plan of a cross bar of the cage. Fig. 10 is a cross section similar to Fig. 5, showing a modified type of fins.

Similar reference letters refer to like parts throughout the several views.

This bearing consists of an inner bearing ring or cone 1 having circumferential shoulders or flanges 2 at each end, the rollers 3, an outer bearing ring 4 having an interior circumferential shoulder or flange 5 at one end, and a cage for the rollers formed of two stampings of sheet metal. The rings and rollers will be ground to exact size, but the sheet metal parts of the cage may be resilient and therefore need only be approximately the correct dimensions.

One of the members of the cage is formed from a blank consisting of a ring 6 and radially extending fingers 7 which are narrowed at their points of attachment with the ring. Each finger may have notches formed by striking down the tongues 8, and the edges are bent up so that after the fingers are swung in to extend parallel to each other at right angles to the ring 6, the bent edges of these fingers constitute fins 9 that are adapted to hold the rollers 3 in proper position between the circumferential shoulders 2 on the inner bearing ring. The other member of the cage is formed of a blank consisting of a ring 10 and radially extending fingers 11, preferably of even width throughout their length. Each finger has a tongue 12 struck up from one side so that when these fingers are bent down parallel to each other and at right angles to the ring 10, the tongues 12 will extend inwardly. The dimensions of this part of the cage are such that the fingers 11 can be slipped endwise over the fingers 7 with little effort, the outer fingers tightly gripping the inner fingers until the tongues 12 snap into the notches formed by striking down the tongues 8. The ends of the tongues 12 will engage the radial ends of the notches in the inner fingers 7 and prevent the end rings from separating. These outer fingers can be sprung out and released to separate the two parts of the cage. Instead of bending up the edges of the fingers 7 to form the fins 9, these parts may be made slightly wider and then turned down as shown in Fig. 10 to form the fins 17, which may be grooved if desired to hold the rollers.

Instead of forming tongues on both inner and outer fingers, the inner fingers may be provided with holes 14 to receive the projections 15 on the outer fingers as shown in Fig. 7.

The ends of the rollers and the shoulders 2 and 5 are so formed that the line of thrust *a—b* (Fig. 8) will be straight and pass through the center of the roller, preferably midway its ends. The points of contact will be quite near the cylindrical portions of the two bearing rings and as near to the circumferences of the rollers as practical to avoid excessive friction. A preferred construction consists in forming the ends of the rollers spherical, the center of the sphere being in the axis of the roller midway of its ends. The end thrust between the two bearing rings will therefore be transmitted by the rollers in the same manner that thrusts are usually transmitted by good ball bearings. The present bearing therefore retains all the advantages of roller bearings in its ability to carry extreme loads. It will be evident that the various parts of this bearing may be proportioned as to the size and number of rollers to meet all demands.

I claim:

1. In a roller bearing, the combination of inner and outer bearing rings, a series of rollers mounted between the bearing rings, cage rings co-axial with the bearing rings and having resilient interlocking fingers extending across between the bearing rings and between the rollers, said fingers being adapted to be detached at will.

2. In a roller bearing, the combination of inner and outer bearing rings having circumferential thrust shoulders, cylindrical rollers mounted between said rings and each having spherical ends whose center is in the axis of the roller midway its ends, and means to keep the rollers properly spaced between the rings.

3. In a roller bearing, the combination of inner and outer bearing rings, a series of cylindrical rollers mounted between the rings, sheet metal rings concentric with and between the ends of the bearing rings, and having resilient interlocking fingers extending across between said rings and between the rollers.

4. In a roller bearing, the combination of inner and outer cylindrical bearing rings, a series of cylindrical rollers evenly spaced between the bearing rings, a cage ring between each end of the inner ring and the outer ring adjacent the ends of the rollers, and having a resilient finger extending inwardly from each cage ring between each two rollers and interlocking with a corresponding finger extending from the other cage ring to form guiding and spacing members for the rollers.

5. In a roller bearing, the combination of cylindrical inner and outer bearing rings, a series of cylindrical rollers evenly spaced between the bearing rings, and a cage for holding the rollers in engagement with the inner bearing ring consisting of a radial ring at each end of said rollers and resilient fingers extending at right angles from each ring parallel to each other, the fingers on the one ring having depression and the fingers on the other ring having tongues adapted to be forced into the depressions by the resiliency of the fingers, one of the fingers of each pair having inclined fins extending into contact with said rollers.

6. In a roller bearing, the combination of inner and outer bearing rings, a series of bearing rollers mounted between the bearing rings, a cage ring adjacent each end of the inner ring and also adjacent the ends of the rollers and having a resilient finger extending inwardly between each two rollers and interlocking with a finger extending from the other cage ring to form guiding and spacing members for the rollers.

7. In a roller bearing, the combination of inner and outer cylindrical bearing rings, a series of cylindrical rollers mounted between the bearing rings, a sheet metal ring between each end of the inner ring and the outer ring adjacent the ends of the rollers, and a resilient finger extending inwardly from each sheet metal ring between each two rollers and interlocking to form guiding and spacing members for the rollers.

In testimony whereof I sign this specification.

ELMER DWIGHT DUNNING.